UNITED STATES PATENT OFFICE.

DANIEL RITCHEY, OF NAPA CITY, CALIFORNIA.

IMPROVEMENT IN COMPOSITIONS FOR PAVEMENTS.

Specification forming part of Letters Patent No. 173,497, dated February 15, 1876; application filed January 3, 1876.

*To all whom it may concern:*

Be it known that I, DANIEL RITCHEY, of Napa City, Napa county, California, have invented certain new and useful Improvements in Composition for the Construction of Fences, Walls, Levees, Road-Beds, &c.; and I hereby declare the following to be a full, clear, and exact description thereof.

My invention relates to a composition of matter useful for the construction of fences, walls, levees, road-beds, &c., and consists in the composition hereinafter described and claimed.

To enable others skilled in the art to make and use my invention, I will proceed to describe the exact manner in which I have carried it out.

I take the earth or soil known in science as trachytic earth, which results from the erosion or decomposition of volcanic rocks, and moisten the same so that I can squeeze it with my hand and make it stick together. Of this I make a layer of any required size, and from six to eight inches deep. Over this I sprinkle asphaltum or coal-tar and pack the mixture. I then add another layer of earth of from four to six inches, again putting on the tar or oil, and packing as before. This process is continued until I have a sufficient height of the material, when it is allowed to dry thoroughly, and becomes a solid mass, as hard as ordinary stone. In practical tests I find coal-tar, coal-oil, and asphaltum to be about the same in efficiency. Salt and alkali may be added in some localities with advantage. It is a well-known fact that in large districts of our country, and particularly on the Pacific Slope, where trachytic earth prevails, timber and other materials for building fences are exceedingly scarce and very expensive, and my invention is designed particularly to supply a cheap fencing material in such districts. Actual experiments demonstrated the fact that the trachytic earth may be plowed up on a line where it is desired to erect a fence or wall, and with my simple invention the same can be erected in a most substantial manner and at a trifling cost.

Having thus described my invention, what I claim as new, and desire to secure by Letters Patent, is—

The composition as described, consisting of trachytic earth and asphaltum, coal-tar, or coal-oil, for the construction of fences, walls, levees, road-beds, and other analogous uses, substantially as set forth.

DANIEL RITCHEY.

Witnesses:
LOUIS BRUCK,
G. W. TOWLE.